(12) United States Patent
Cascetta et al.

(10) Patent No.: US 12,573,162 B2
(45) Date of Patent: Mar. 10, 2026

(54) MODELLING METHOD FOR MAKING A VIRTUAL MODEL OF A USER'S HEAD

(71) Applicant: LUXOTTICA GROUP S.P.A., Milan (IT)

(72) Inventors: Cristian Cascetta, Milan (IT); Luca Mazzocchi, Legnano (IT); Fabio Mazzarella, Busto Arsizio (IT); Kamal Fahmy Salama, Monza (IT); Filippo Bruno, Milan (IT)

(73) Assignee: LUXOTTICA GROUP S.P.A., Milan (IT)

( * ) Notice: Subject to any disclaimer, the term of this patent is extended or adjusted under 35 U.S.C. 154(b) by 268 days.

(21) Appl. No.: 18/356,303

(22) Filed: Jul. 21, 2023

(65) Prior Publication Data

US 2024/0046593 A1 Feb. 8, 2024

(30) Foreign Application Priority Data

Aug. 3, 2022 (IT) ........................ 102022000016452

(51) Int. Cl.
*G06T 19/20* (2011.01)
*G06T 7/194* (2017.01)
(Continued)

(52) U.S. Cl.
CPC .............. *G06T 19/20* (2013.01); *G06T 7/194* (2017.01); *G06T 7/70* (2017.01); *G06V 10/24* (2022.01);
(Continued)

(58) Field of Classification Search
None
See application file for complete search history.

(56) References Cited

U.S. PATENT DOCUMENTS 11,151,767 B1 * 10/2021 Zoss ........................ G06T 17/00
2012/0306874 A1 * 12/2012 Nguyen ............... G06V 20/647
345/420

(Continued)

FOREIGN PATENT DOCUMENTS

CN 114612539 A 6/2022
EP 3370208 A2 9/2018

OTHER PUBLICATIONS

Azevedo et al., "An augmented reality virtual glasses try-on system" 2016 XVIII Symposium on Virtual and Augmented Reality (SVR). IEEE, (Jun. 2016) pp. 1-9.

(Continued)

*Primary Examiner* — Kyle Zhai
(74) *Attorney, Agent, or Firm* — CANTOR COLBURN LLP

(57) ABSTRACT

A modelling method for making a virtual model of a user's head includes operations of: acquiring a plurality of depth images of a user's head in different head poses; processing the acquired depth images; localising on the two-dimensional images first marker points corresponding to characteristics of the head; estimating the head by estimating the yaw, pitch and roll angles of the head and the positioning of the head along three axes of a reference system of Cartesian axes for each of the two-dimensional images of the depth images, performing a transformation of the head pose; projecting the first marker points located in the respective cloud of points; associating iteratively in pairs the clouds of points until obtaining a cloud of synthesis points; aligning the cloud of synthesis points; and deforming the statistical head model by means of a minimization algorithm of a predefined cost function.

12 Claims, 3 Drawing Sheets

(51) Int. Cl.

| | |
|---|---|
| *G06T 7/70* | (2017.01) |
| *G06V 10/24* | (2022.01) |
| *G06V 10/25* | (2022.01) |
| *G06V 10/762* | (2022.01) |

(52) U.S. Cl.
CPC ............ *G06V 10/25* (2022.01); *G06V 10/762* (2022.01); *G06T 2207/10028* (2013.01); *G06T 2207/20084* (2013.01); *G06T 2219/2004* (2013.01)

(56) References Cited

U.S. PATENT DOCUMENTS

| | | | | |
|---|---|---|---|---|
| 2013/0287294 A1* | 10/2013 | Ye | ........................... | G06T 17/10 |
| | | | | 382/154 |
| 2014/0362091 A1* | 12/2014 | Bouaziz | .................. | G06T 7/292 |
| | | | | 345/473 |
| 2019/0035149 A1* | 1/2019 | Chen | .................... | G06V 40/166 |

OTHER PUBLICATIONS

Ding et al., "Efficient 3D face recognition in uncontrolled environment" Advances in Visual Computing: 14th International Symposium on Visual Computing, ISVC 2019, (Oct. 2019) pp. 430-443.
Kim et al., "Accurate 3D face modeling and recognition from RGB-D stream in the presence of large pose changes" 2016 IEEE International Conference on Image Processing (ICIP). IEEE, (Sep. 2016) pp. 3011-3015.
Mora et al., "Gaze estimation from multimodal kinect data" 2012 IEEE Computer Society Conference on Computer Vision and Pattern Recognition Workshops. IEEE, (Jun. 2012) pp. 25-30.
Search Report with Written Opinion issued in Italian Application No. 102022000016452; Application Filing Date Aug. 3, 2022; Date of Mailing Mar. 2, 2023 (12 pages).
Zollhöfer et al., "Automatic reconstruction of personalized avatars from 3D face scans" Computer Animation and Virtual Worlds vol. 22 Nos. 2-3 (Apr. 2011) pp. 195-202.

* cited by examiner

MODELLING METHOD FOR MAKING A VIRTUAL MODEL OF A USER'S HEAD

CROSS-REFERENCE TO RELATED APPLICATIONS

This application claims the benefit of Italian Application Serial No. 102022000016452 filed Aug. 3, 2022, the disclosure of which is incorporated herein by reference in its entirety.

BACKGROUND

The present invention relates to a modelling method for making a three-dimensional virtual model of a user's head that can be implemented using terminals such as personal computers, smartphones, laptops and so on.

Such a modelling method may be used in applications that enable displaying accessories such as glasses virtually worn on the virtual three-dimensional model of the user's head. This is particularly useful to promote the on-line sale of products that are generally tried on by the potential buyer before being purchased in order to assess their aesthetic effect.

In order to obtain a trial use as realistic as possible, it is necessary to have a three-dimensional virtual model of the user's head that is as accurate as possible.

SUMMARY

Various non-limiting embodiments of the present disclosure provides a modelling method for making a virtual model of a user's head, and a computer system configured to perform the same. The method includes operations of: acquiring a plurality of depth images of a user's head in different head poses; processing the acquired depth images; localising on the two-dimensional images first marker points corresponding to characteristics of the head; estimating the head by estimating the yaw, pitch and roll angles of the head and the positioning of the head along three axes of a reference system of Cartesian axes for each of the two-dimensional images of the depth images, performing a transformation of the head pose; projecting the first marker points located in the respective cloud of points; associating iteratively in pairs the clouds of points until obtaining a cloud of synthesis points; aligning the cloud of synthesis points; and deforming the statistical head model by means of a minimization algorithm of a predefined cost function.

BRIEF DESCRIPTION OF THE DRAWINGS

The characteristics and advantages of a modelling method for making a virtual model of a user's head according to the present invention will be more evident from the following exemplary though non-limiting description, referring to the attached schematic drawings in which.

DETAILED DESCRIPTION

Figure 1:
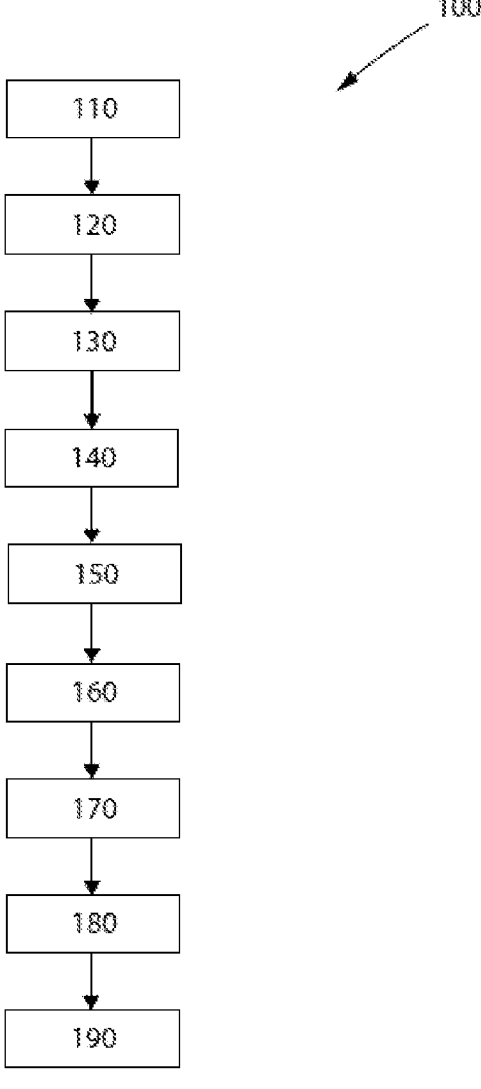
FIG. 1 is a flowchart representing a modelling method according to a first embodiment of the present invention.
Figure 2:
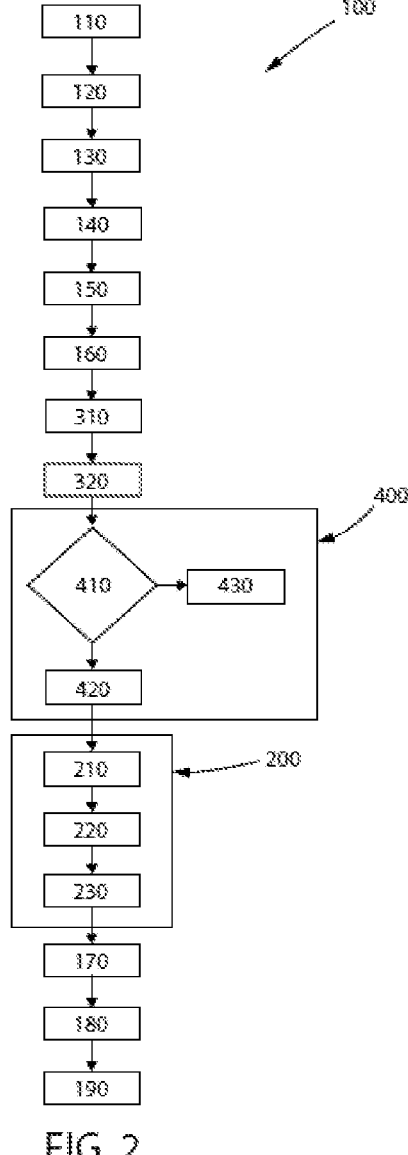
FIG. 2 is a flowchart representing a modelling method according to a second embodiment of the present invention.

Known modelling methods involve firstly acquiring a plurality of depth images of a user's head in different poses.

A depth image is defined as a two-dimensional or 2D image in which each pixel is associated with a respective value of the distance of the point represented by the pixel from the image observation and capture point. Depth images acquisition systems are known and may comprise either a stereo-vision system or a so-called depth camera. If the depth images acquisition system is properly calibrated, the values of the distances associated with the pixels can be determined directly in real metric units such as metres.

In any case, the depth images acquisition system is configured to capture a two-dimensional image, determine a two-dimensional map of data representative of the distances of each pixel from an observation point, and associate the two-dimensional map with the acquired two-dimensional image in such a way that each pixel in the acquired two-dimensional image is associated with a data of the two-dimensional map. This association is performed by means of synchronisation algorithms.

Each pixel of each depth image may therefore be represented by a point in a three-dimensional Cartesian reference system having three spatial coordinates derived from the two-dimensional map. Then each depth image is associated with a respective cloud of three-dimensional points.

Nowadays, more and more terminals, such as smartphones, tablets and so on, are provided with depth cameras to make surveys in several application contexts, e.g., in the construction or eyewear fields.

After acquiring the plurality of depth images, the known modelling methods generally involve a merging step wherein the clouds of three-dimensional points of the acquired depth images are merged together to form a cloud of synthesis points.

After the merging step, a step is provided wherein the cloud of synthesis points is aligned to a statistical head model, such as the so-called Basel head. A statistical head model is a geometric model which describes a collection of semantically similar objects in a compact shape. The statistical head model is composed by an average head obtained from the average of a multitude of three-dimensional heads and their deformation described by the linear combination of a set of eigenvalues on the corresponding eigenvectors. By varying the eigenvalues, different anatomically coherent heads are obtained. Finally, the known modelling methods comprise the so-called morphing step wherein the statistical head model is submitted to a non-rigid deformation process by means of a non-rigid iterative closest point or ICP algorithm aimed at minimising distances in such a way as to come as close as possible to the respective points in the cloud of synthesis points. In practice, the statistical head model is deformed to be similar to the cloud of synthesis points without losing the typical human proportions included in the statistical head model. The deformed statistical head model creates a definitive virtual model of the user's head.

The known modelling methods, however, have certain drawbacks. A first drawback lies in that morphing is performed on all the points of the cloud of synthesis points using the same algorithms and targets; the accuracy of the model obtained requires enormous computational efforts to be high.

A second drawback is that the accuracy of the model may not be sufficient for a trial use of a pair of virtual glasses, which, involving the virtual positioning of a three-dimensional virtual model of glasses on the definitive virtual model of the head, requires great accuracy especially in the contact areas between the two virtual models.

The object of the present invention is to overcome the above-mentioned drawbacks and in particular to devise a modelling method for making a virtual model of a user's head which is capable of achieving a high accuracy in the area of the head involved in the use of glasses while maintaining a low computational cost compared to the known art.

This and other objects according to the present invention are achieved by making a modelling method for making a virtual model of a user's head.

A further object of the present invention is to overcome the above-mentioned drawbacks and in particular to devise a computer program loadable into a memory of an electronic computer and comprising instructions that induce the electronic computer to implement a modelling method for making a virtual model of a user's head that is more accurate and faster than those of the prior art. This further object according to the present invention is achieved by making a computer program as described herein.

With reference now to the figures, a modelling method for making a virtual model of a user's head is shown, globally referred to as 100.

Such a modelling method 100 may be implemented by an electronic computer or controller provided with a memory for data storage. In particular, the modelling method 100 may be implemented by means of a modelling or morphing program or software loaded into the computer memory and executable by the computer or controller. For example, a computer system including a controller or electronic computer can execute computer instructions stored in memory to perform the modelling method 100 according to one or more non-limiting embodiments of the present disclosure.

Such a modelling or morphing program thus comprises instructions that induce the electronic computer or controller to implement the modelling method 100 when the electronic computer runs the program.

In one or more non-limiting embodiments, the computer system (e.g., the controller or computer) can execute a machine learning algorithm which can be trained to learn specific head characteristics including, but not limited to, e.g., such as eyes, nose, cheekbones, ears, chin, mouth and so on. Following the training, the computer system (e.g., controller or computer) can estimate the pose 140 of a user's head included in an image and generate a three-dimensional virtual model of the user's head having improved accuracy (e.g., in the area of the head involved in the use of glasses) while maintaining a low computational cost compared to virtual models generated according to conventional virtual modelling techniques.

According to a non-limiting embodiment, the modelling programme 100 may be combined with an e-commerce platform for glasses. In this case, the modelling or morphing program is run each time a user purchases glasses on the eyewear e-commerce platform.

More generally, the modelling or morphing program may also be run by an operator's electronic terminal before a user has purchased a pair of glasses.

In one or more non-limiting embodiments, the computer system is implemented as an electronic terminal which can include, but is not limited to, a desktop personal computer, a laptop computer, a smartphone, a tablet, a personal digital assistant (PDA), and so on.

The electronic terminal comprises a depth camera and an electronic computer provided with a memory for data storage in which a modelling or morphing program or software according to the present invention is loaded. The modelling method 100 performed by the computer or controller comprises the steps of:

acquiring 110 a plurality of depth images of a user's head in different poses wherein each of said depth images comprises a two-dimensional or 2D image and a two-dimensional map of data representative of the distances of each pixel from an observation point coinciding with the position of said depth camera, the two-dimensional map being aligned with the two-dimensional or 2D image so that each pixel of the acquired two-dimensional image is associated with a datum of the two-dimensional map;

for each of said acquired depth images, performing 120 a processing of the acquired depth image by correcting the alignment between the two-dimensional data map and the two-dimensional or 2D image;

for each of said two-dimensional images of said acquired and processed depth images localizing 130 on the two-dimensional image first marker points corresponding to specific characteristics of the head, where "localizing" refers to determining the position of an object (e.g., the user's head) in the two-dimensional images;

for each of said two-dimensional images of said acquired depth images, estimating 140 the pose of the head by estimating the yaw, pitch and roll angles of the head and the positioning of the head along the three axes X, Y, Z of a first reference system of Cartesian axes XYZ;

for each of said two-dimensional images of said depth images performing a transformation of the pose 150 of the head by modifying the yaw, pitch and roll angles of the head and the positioning of the head previously estimated making them referred to a second reference system of Cartesian axes X'Y'Z' that has a predefined relationship with the first reference system of Cartesian axes XYZ;

for each of said acquired depth images, projecting 160 said first marker points localized in the respective cloud of points of said depth image so as to obtain corresponding first three-dimensional marker points in the second reference system of Cartesian axes X'Y'Z';

associating 170 iteratively in pairs the clouds of points of the depth images acquired and processed by means of a rigid sequential iterative closest point algorithm or ICP until obtaining a cloud of synthesis points which represents a synthesis of all the poses selected and also comprises the first three-dimensional marker points;

aligning 180 the cloud of synthesis points with a statistical head model by means of a rigid iterative closest point type alignment algorithm or Nearest Neighbour ICP;

deforming 190 the statistical head model by means of an algorithm for minimizing a predefined cost function so that said statistical head model is as close as possible to the cloud of synthesis points obtaining a model of the user's head.

The step of acquiring 110 a plurality of depth images is, in particular, carried out by taking a photograph using a depth camera or a camera system of a mobile terminal or desktop PC adapted to function as a depth camera.

The step of localising 130 the first marker points corresponding to specific head characteristics, such as eyes, nose, cheekbones, ears, chin, mouth and so on, is performed by a first algorithm. As described herein, the term "localizing" refers to the identification or the finding the position or the pixel spatial coordinates in the space of the two-dimensional image. For example, the first algorithm may be a machine learning algorithm.

When the first algorithm is of the machine-learning type, for example, it detects and localises the first marker points corresponding to specific head characteristics (e.g., eyes, nose, cheekbones, ears, chin, mouth and so on) on the basis of a computing model trained on a set of images in which the position of these points is already known. In one or more non-limiting embodiments, the computing model can be trained using a set or plurality of training images input to the computer system (e.g., the computer or controller) in which the position of the pre-marker points mapped to corresponding specific head characteristics (e.g., eyes, nose, cheekbones, ears, chin, mouth and so on) is already known. Accordingly, the algorithm can be trained such that the computer or controller can iteratively learn the location of the specific head characteristics based on the pre-set markers of the plurality of training images and identify the specific head characteristics associated with the first marker points.

The computer system (e.g., the controller or computer) estimates the head pose 140 of a user by executing an algorithm called "solve PnP", which stands for "solve perspective n points". Given as inputs (i) the first two-dimensional marker points, (ii) the three-dimensional co-ordinates of the points of the statistical head model, which semantically correspond to the first two-dimensional marker points, (iii) the distortion coefficients and the intrinsic matrix of the camera, the controller or computer can executed the "solve PnP" algorithm to estimate the pose of the head in the XYZ Cartesian axis reference system by generating as output a pair of vectors, one having as components the three yaw, roll, pitch angles and one having as components the coordinates of the head points along the three X, Y, Z axes of the reference system.

Each point of the head is, thus, associated to a relative pair of vectors generated from the pose estimation algorithm; this pair of vectors represent the positioning and the orientation of each point of the head in the first reference system of Cartesian axes XYZ. The first reference system is the one of the camera and can be different or equal to the second reference system of Cartesian axes X'Y'Z' which is the reference system of the pose estimation algorithm, that is the "solve PnP" algorithm. This second reference system coincides with that of the statistical head model and is in a predefined and thus known relationship with the first reference system. This predefined and known relationship is an initial setting.

According to a non-limiting embodiment, the semantically corresponding points refer to indicating points that refer to the same characteristics of the head, such as the tip of the nose, the ear lobe and so on.

The head pose transformation 150 provides to obtain for each point of the head a new pair of vectors representative of the positioning and the orientation of the point in the second reference system of Cartesian axes X'Y'Z' which, as above reported, coincides with that of the head statistical model. The pose transformation, therefore, serves to facilitate, that is to make faster from a computational point of view, the phase of alignment 180 of the cloud of synthesis points with the head statistical model.

Depth image processing 120 refers to a process (e.g., performed by the controller or computer) that involves finding the distortion coefficients and intrinsic matrix of the camera, as provided by the manufacturer, and then processing the image on the basis of these distortion coefficients and intrinsic matrix. This processing modifies the alignment between the two-dimensional data map and the two-dimensional or 2D image that is the association between each pixel of the acquired two-dimensional image with a datum of the two-dimensional map. This modification involves a correction of the initial association pixel-datum of the two-dimensional map set at the time of the depth image acquisition.

In the association step 170, the clouds of points of consecutively acquired and processed depth images are associated (e.g., by the controller or computer) in pairs by the rigid sequential iterative closest point or ICP algorithm. This association takes place iteratively; thus, for example, after associating the cloud of points of the first image with the cloud of points of the second image, obtaining a first cloud of merging points, and the cloud of points of the third image with the cloud of points of the fourth image, obtaining a second cloud of merging points, the first cloud of merging points is then associated with the second cloud of merging points. According to a non-limiting embodiment, the rigid sequential iterative closest point algorithm considers the points in the two closest clouds of points as referring to the same head point and associates them. In particular, the rigid ICP algorithm is iterative and receives as input two clouds of points: a cloud of points as reference, which remains fixed, and a cloud of points as source, which is rigidly transformed on the basis of predefined criteria.

Such an algorithm is referred to herein as "rigid" because the transformations involved are of the rigid type, i.e., they preserve Euclidean distances between pairs of points.

Thereby, after a series of iterations (e.g., series of processing operations performed by the controller or computer), the cloud of synthesis point is obtained.

The alignment step 180 is performed (e.g., by the controller or computer) for example by considering the so-called Basel head as a statistical head model.

The rigid iterative closest point alignment or Nearest Neighbour ICP algorithm is a rigid ICP algorithm which provides the following steps:

a) for each point in the cloud of source points, determining the nearest neighbour point in the cloud of reference points;

b) estimating the roto-translation matrix that minimises a point-to-point distance measure, such as the mean square error value, between the corresponding points found in the previous step;

c) transforming the vertices of the cloud of source points using the roto-translation matrix estimated in the previous step;

d) repeating steps a)-c) for a number of predetermined iterations and in any case necessary to make the error less than a certain predefined threshold.

The deformation step 170 is performed (e.g., by the controller or computer) by means of a minimisation algorithm of a predefined cost function.

The cost function (L) which is minimised in the deformation step 190 is the linear combination of a plurality of components comprising at least the components named loss_nn and loss_coeff, weighted by respective always positive coefficients, w_nn, and w_coeff, which may be modified to vary the importance of the single component in the final computation of the cost function itself.

In detail, the loss_nn component is proportional to the distance between the points of the statistical head model that is to be deformed, and the nearest neighbour points belonging to the cloud of synthesis points determined in the alignment step 160.

The nearest neighbour points are in particular determined as the points in the cloud of synthesis points at the shortest distance from the respective points in the statistical head model.

The loss_coeff component is equal to the norm of the eigenvalues of the statistical head model.

In a first embodiment, the cost function (L) is defined by the following expression:

$$L=w\_nn*loss\_nn+w\_coef*loss\_coef$$

The deformation process of the statistical head model may ultimately be understood as an optimisation process aimed at identifying a minimum of the cost function described above, which defines as output both a roto-translation matrix to be applied to the statistical head model and the eigenvalues of that statistical head model.

According to a non-limiting embodiment, the modelling method 100 comprises, prior to the association step 170, the steps of:

identifying 310 among the two-dimensional images of the depth images at least one extreme or target two-dimensional image, i.e., one or more of the two-dimensional images with yaw angle at the end of a predefined range;

for each of the extreme (i.e., target) two-dimensional images, identifying 320 on the two-dimensional image second marker points corresponding to specific characteristics of the head that have been selected and localized manually by said user.

According to a non-limiting embodiment, this step includes allowing the user, observing the extreme two-dimensional images, to manually select the second marker points corresponding to e.g., ears, nose and so on.

The extreme (i.e., target) two-dimensional images, in particular, have the highest yaw angle and the lowest yaw angle of all the two-dimensional images. For example, the range of acceptability may be for instance of [−40°, 40°].

The second marker points may therefore be assumed to be more reliable than the first marker points identified by the first algorithm.

As described herein, the alignment algorithm advantageously described herein imposes an exact correspondence between the second marker points and relative main points of the statistical head model, i.e., the 3D points belonging to the statistical head model, which are predefined and can correspond to several specific points of the head such as, for example, the nose tip, the ear tragion. This makes the alignment step 160 more accurate as the alignment algorithm combines a Nearest Neighbour logic and the exact correspondence between the second marker points and the main points of the statistical head model.

In that case, the cost function (L) is defined by the expression:

$$L=w\_nn*loss\_nn+w\_fixed*loss\_fixed+ \\ w\_coef*loss\_coef,$$

where the term loss_fixed is proportional to the distance among the points for which an exact match is desired among the points in the cloud of synthesis points and the points in the statistical head model.

According to a non-limiting embodiment, the alignment algorithm is performed only on the points of the statistical head model belonging to a pre-set region of interest of the head comprising at least the eyes and ears. Accordingly, the alignment step 180 is performed faster and achieves increased accuracy precisely at the area of the head concerned by the use of glasses.

The pre-set region of interest of the head may be identified by a band at eye and ear level surrounding the user's head.

According to a non-limiting embodiment, before the step of iteratively associating 170 in pairs the acquired depth images and after the possible step of identifying the second marker points 320, the modelling method 100 provides a filtering step 400 in which for each of the acquired depth images the yaw angle of the respective transformed pose is compared 410 with an acceptability range; if the yaw angle is comprised within that acceptability range the depth image is considered as acceptable 420, if the yaw angle is not comprised within the acceptability range the depth image is considered as unacceptable 430.

Subsequently, it may be provided to evenly subdivide the angle acceptability range into a number of sub-ranges equal to the number of depth images to be used for the three-dimensional reconstruction. From the depth images that have passed the filtering step, i.e., those considered as acceptable in step 420, those whose yaw angles are closest to the above-mentioned sub-ranges are selected, discarding the other images and they are considered as verified.

According to a non-limiting embodiment, the step of iteratively associating 170 in pairs the acquired depth images is only performed on the images considered as acceptable or, if provided, on the images considered as acceptable and verified.

This is done in order to ensure that the image shows all the most important details of the user's head.

On the one hand, this results in a reduction of the time and computational costs for making the model of the user's head, and on the other hand, it ensures that the most complete representation of the user's head is generated as possible.

According to a non-limiting embodiment, prior to the step of iteratively associating 170 in pairs the acquired depth images, the modelling method also comprises a preparation step 200 in which for each of the acquired depth images or for each of the acceptable acquired depth images, they are provided the steps of:

localizing 210 the user's head;

removing 220 the background in order to remove unwanted noise components;

applying 230 a DBSCAN-type clustering algorithm or the like to remove further outliers, thus obtaining a prepared depth image.

The DBSCAN or similar algorithms are selected from those commonly known in the state of the art.

According to a non-limiting embodiment, the prepared depth image includes only of the points that form the head, and this contributes to further reduce the cost and computational time of making the second model of the user's head.

From the description made, the characteristics of the modelling method, object of the present invention, are clear, as are the relative advantages.

In fact, the adoption of a cost function minimisation algorithm in the deformation step allows for more accurate and flexible control of the deformation process, as the weight coefficients of the cost function may be varied as required.

In addition, if manual selection of second marker points is provided, the modelling method is even more accurate as a more accurate alignment step is possible.

As described herein, the presence of the pre-set head region of interest, the filtering operation, and the preparation operation result in a significant reduction in time and computational costs compared to known modelling methods.

Finally, it is clear that the modelling system according to various non-limiting embodiments described herein is susceptible of numerous modifications and variations, all of which are within the scope of the invention. In addition, all the details may be replaced by technically equivalent elements. In practice, the materials used, as well as their dimensions, can be of any type according to the technical requirements.

Figure 3:
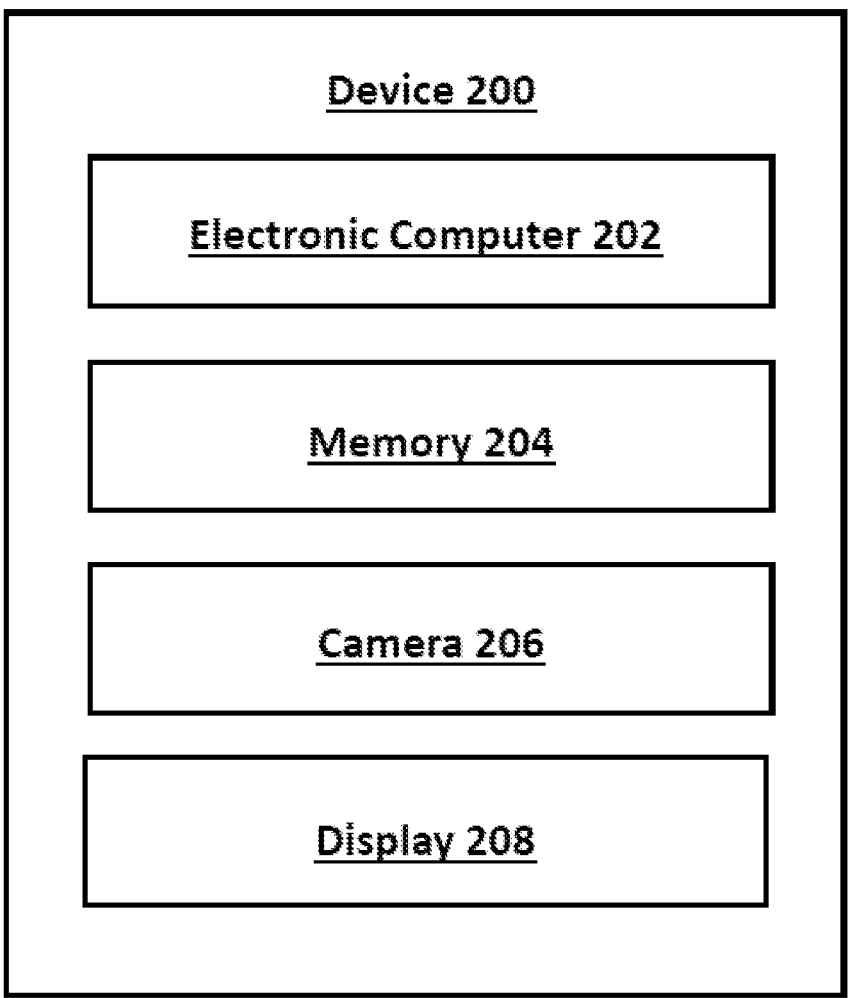
FIG. 3 is a block diagram illustrating an electronic device configured to generate a virtual model of a user's head according to a non-limiting embodiment of the present invention.

Turning now to FIG. 3, a diagram depicting an electronic device 200 (e.g., an electronic terminal) configured to generate a virtual model of a user's head is illustrated according to a non-limiting embodiment of the present invention. As described herein, the electronic device 200 can include, but is not limited to, a desktop personal computer, a mobile terminal, a smartphone, a tablet computer, a laptop computer, a handheld electronic device, a smart wearable device, and so on.

The electronic device 200 includes an electronic computer 202 (or controller), memory 204, a camera 206, and a display screen 208. In one example, the device 200 may be communicatively coupled to a database (not shown). In one embodiment, the database may be internal to device 200. In one embodiment, the database may be external to device 200. In some embodiments, portions of database may be both internal and external to device. In one or more non-limiting embodiments the database stores multiple images each having marker points mapped to specific head characteristics (e.g., such as eyes, nose, cheekbones, ears, chin, mouth and so on) in which the position of these points is already known.

The electronic computer 202 can perform a modelling method which includes estimating the pose 140 of a user's head included in an image and generating a three-dimensional virtual model of the user's head having improved accuracy (e.g., in the area of the head involved in the use of glasses) while maintaining a low computational cost compared to virtual models generated according to conventional virtual modelling techniques.

The invention claimed is:

1. A modelling method for making a virtual model of a user's head comprising the steps:

acquiring, by an electronic computer, a plurality of depth images of a user's head in different poses wherein each one of said depth images comprises a two-dimensional or 2D image and a two-dimensional map of data representative of distances of each pixel from an observation point coinciding with the position of said depth camera, said two-dimensional map being aligned with said two-dimensional or 2D image so that each pixel of the acquired two-dimensional image is associated with a data of the two-dimensional map;

for each one of said acquired depth images, performing, by the electronic computer, a processing of said acquired depth image by correcting the alignment between said two-dimensional data map and said two-dimensional or 2D image;

for each one of said two-dimensional images of said acquired and processed depth images, localizing by the electronic computer, first marker points on the two-dimensional image, the first marker points corresponding to specific characteristics of the user's head;

for each one of said two-dimensional images of said acquired and processed depth images, estimating by the electronic computer the pose of the user's head by estimating the yaw, pitch and roll angles of the user's head and the positioning of the user's head along the three axes X, Y, Z of a first reference system of Cartesian axes XYZ;

for each one of said two-dimensional images of said depth images performing by the electronic computer a transformation of the pose of the user's head by modifying the yaw, pitch and roll angles of the user's head and the positioning of the user's head previously estimated making them referred to a second reference system of Cartesian axes X'Y'Z' that has a predefined relationship with the first reference system of Cartesian axes XYZ;

for each one of said acquired depth images, projecting by the electronic computer said first marker points localized in respective cloud of points of said depth image so as to obtain corresponding first three-dimensional marker points in the second reference system of Cartesian axes X'Y'Z';

associating, by the electronic computer, iteratively in pairs the respective cloud of points of the depth images acquired and processed by means of a sequential iterative closest point algorithm until obtaining a cloud of synthesis points comprising the first three-dimensional marker points;

aligning, by the electronic computer, said cloud of synthesis points with a statistical head model by means of a rigid Nearest Neighbour iterative closest point (ICP) or ICP type alignment algorithm; and deforming, by the electronic computer, said statistical head model by means of an algorithm for minimizing a predefined cost function so that said statistical head model is aligned with the cloud of synthesis points to obtain a model of the user's head.

2. The modelling method according to claim 1 wherein before the association step it also comprises the steps:

identifying among said two-dimensional images of said depth images at least one target two-dimensional image having the highest yaw angle and the lowest yaw angle;

for each one of the at least one target two-dimensional image, identifying on the two-dimensional image second marker points corresponding to specific characteristics of the user's head that have been selected and localized manually by a user.

3. The modelling method according to claim 2 wherein said alignment algorithm imposes an exact match between the second marker points and three-dimensional (3D) points of the statistical head model.

4. The modelling method according to claim 1, wherein said alignment algorithm is performed only on the points of the statistical head model belonging to a pre-set region of interest comprising a band of the user's head at eye level.

5. The modelling method according to claim 1, comprising before the step of iterative association in pairs of the acquired depth images, a filtering step in which for each one of said acquired depth images the yaw angle of a respective transformed pose is compared with an acceptability range, if said yaw angle is included in said acceptability range said depth image is considered as an acceptable depth image, if said yaw angle is not included in said acceptability range said depth image is considered as non-acceptable, said step of iterative association in pairs of the acquired depth images being performed only on the images considered as acceptable.

6. The modelling method according to claim 1, comprising before the step of iterative association in pairs of the acquired depth images, a preparation step wherein for each one of said acquired depth images or for each one of said acceptable acquired depth images:

localizing the user's head;

removing a background;

applying a Density-Based Spatial Clustering of Applications with Noise (DBSCAN) type clustering algorithm thereby obtaining a prepared depth image.

7. The modelling method according to claim 1, wherein a cost function is a linear combination of a plurality of components comprising a first cost function component (loss_nn) and a second cost function component (loss_coeff), weighed by means of a first positive coefficient (w_nn), and a second positive coefficient (w_coef), wherein the loss_nn is proportional to the distance among three-dimensional (3D) points of the statistical head model to be deformed, and a nearest neighbour points belonging to the cloud of synthesis points determined in the alignment step, and wherein the loss_coeff is equal to a norm of the eigenvalues of the statistical head model, said cost function being defined by the expression:

$$L = \text{w\_nn} * \text{loss\_nn} + \text{w\_coef} * \text{loss\_coef.}$$

8. The modelling method according to claim 7 wherein the cost function is defined by the expression:

$$L = \text{w\_nn} * \text{loss\_nn} + \text{w\_fixed} * \text{loss\_fixed} + \text{w\_coef} * \text{loss\_coef}$$

wherein the term loss_fixed is proportional to a distance among points for which an exact match is desired among the points in the cloud of synthesis points and the points in the statistical head model.

9. The modelling method according to claim 1, wherein the localizing comprises:

training a machine learning algorithm to detect the first marker points and correspond the first marker points to a specific head characteristic of the user's head.

10. The modelling method according to claim 9, wherein the training comprises:

inputting a plurality of training images of a head, each of the training images including pre-set markers indicating known positions of specific head characteristics, wherein the electronic computer iteratively learns a location of the specific head characteristics based on the pre-set markers.

11. A computer program product to control a controller to generate a virtual model of a user's head, the computer program product comprising a non-transitory computer readable storage medium having program instructions embodied therewith, the program instructions executable by the controller to perform the modelling method according to claim 1.

12. An electronic terminal comprising a depth camera and an electronic computer provided with the computer program product according to claim 11 is loaded.

* * * * *